Aug. 31, 1948.  W. DE FLIGUE  2,448,298
RECIPROCATING CONVERTER
Filed Feb. 28, 1946

Inventor:
Wladimir de Fligue
By: Watson, Cole, Grindle & Watson
Att'ys

Patented Aug. 31, 1948

2,448,298

UNITED STATES PATENT OFFICE 2,448,298

RECIPROCATING CONVERTER

Wladimir de Fliguè, Paris, France

Application February 28, 1946, Serial No. 650,961

4 Claims. (Cl. 171—123)

1

This invention relates to electro-magnetic devices, and more particularly to means for converting electromagnetic oscillations into alternating current, via mechanical vibrations.

It is an object of my invention to provide improved means whereby informations in respect of a pressure, a temperature or other factor may be transmitted to a remote point.

Another object is to provide improved means whereby an apparatus is brought under control of an electric current having a particular characteristic, for instance its frequency, a more specific object being to provide a servo-control of selective character wherein control does not take place for any other frequency than a predetermined one.

A more general object is to provide improved means whereby remote controls are secured the effect of which varies as a function of the cause thereof.

Further objects will appear as the specification proceeds.

The foregoing objects can be attained by the devices more or less diagrammatically illustrated in the accompanying drawing given solely by way of non-limitative example and in which.

Similar numerals refer to similar parts throughout the several views.

Figure 1:
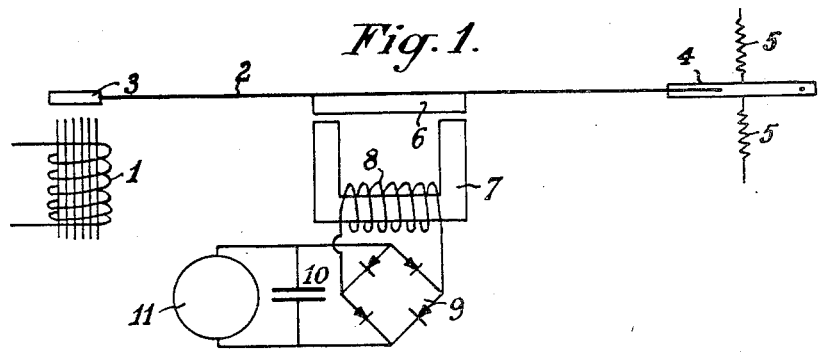
Fig. 1 is a basis diagram underlying the principle of my invention.

In the preferred embodiment of this invention, my device includes a coil 1 through which a periodic current flows. The current may be alternating current supplied from the mains or it may have a frequency which is kept constant by conventional means, or again it may have a frequency controlled by that of the receiving unit to be hereinafter mentioned. Said receiving unit includes a resilient strip or rod 2 made of magnetic material or alternatively having a magnetic element 3 at an end thereof. Strip or rod 2 is held at its other end in a support 4 which may be stationary or lie in a variable position controlled as a function of the magnitude of a phenomenon the variations of which are to be measured and/or used for remote control. I have diagrammatically shown at 5 a connection through which a physical phenomenon such as temperature, pressure, humidity amount and so on is adapted to alter the position of support 4.

Attached to or integral with resilient strip or rod 2 is a permanent magnet 6 located in the neighbourhood of a magnetic circuit 7 having a coil 8; when current flows through coil 8, it is delivered to a bridge rectifier 9 from which direct current is supplied by means of a filter 10 to a receiving apparatus 11; the receiving apparatus 11 is preferably a sensitive apparatus such as a voltmeter, an electro-magnetic relay, etc.

The device operates as follows:

The periodic current flowing through coil 1 induces in the same a magnetic field having the same frequency as the parent control current. When the frequency is substantially equal to the mechanical self-frequency of the strip or rod 2, the later vibrates at said frequency, moving permanent magnet 6 therewith. The movements of magnet 6 set up in magnetic circuit 7 an alternating magnetic flux that produces an induced electromotive force in coil 8; the current issued from said force is rectified in rectifier 9 and delivered to the receiving apparatus 11.

The use of rectifier 9 and filter 10 while it is not strictly necessary is preferable when a long line connects said rectifier with receiving apparatus 11 in order to avoid loss in transmission line through induction and capacity; in the case of relays tuned to frequency, the use of rectifier 9 and filter 10 is also beneficial since direct current relays being more sensitive than alternating current relays, the smaller power borrowed from the vibrating strip or rod damps the oscillations of said strip or rod to a less extent so that tuning is sharper.

I shall now proceed with the description of a device for transmitting indications to a remote point and a relay tuned to a predetermined frequency, as specific examples illustrating applications of the foregoing device, but it should be understood that the examples have no limitative character as it is possible to alter parts thereof and/or their relative relationship, e. g. the structure of the receiving apparatus, the location of permanent magnet 6 and magnetic element 3 on strip or rod 2, the means for maintaining a constant frequency of the oscillation producing device and so on without departing from the spirit of my invention.

Figure 2:
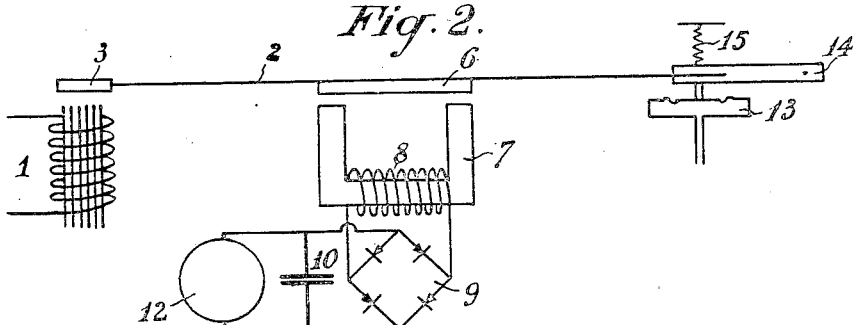
Fig. 2 shows an example of tele-indicating means.

For an indication transmitting device as shown on Fig. 2, it is desirable that a constant frequency be available for the oscillation producing means, or to keep the frequency constant. For this purpose, current may be derived from the mains, or a known device adapted to produce relaxation oscillations may be used (i. e. a device including a condenser which is charged through a resistance and is discharged into a space-discharge tube), or again the frequency may be controlled from that of the vibrating strip or rod through known means such as triode tubes or the like.

The relative position of the vibrating strip or rod 2 and the magnetic circuit 7 is controlled from any physical phenomenon through suitable members (for instance a manometric diaphragm 13 with a biassing spring 15, the strip or rod holder being pivotally mounted at 14) in such a way that the mean gap between permanent magnet 6 and magnetic circuit 7 is influenced by variations of the phenomenon, to wit, pressure in the present instance.

A number of factors cooperate to produce wide variations of induced electromotive force in response to small alterations of gap. As a matter of fact, as the gap becomes larger, the magnetic reluctance of the circuit increases, and assuming the magnet mechanical oscillations have a constant amplitude, their relative value with respect to the gap decreases. On the other hand, as a gap increase results in a lowering of induction in the magnetic circuit, the latter becomes remote from the zone of high permeabilities, thereby producing an effect in the same direction.

The receiving apparatus 12 which may be a voltmeter in the exemplified instance is arranged directly to show the measure of the phenomenon (pressure) in proper units, so that the whole structure provides electromagnetic means for indicating pressure at a remote point.

Figure 3:
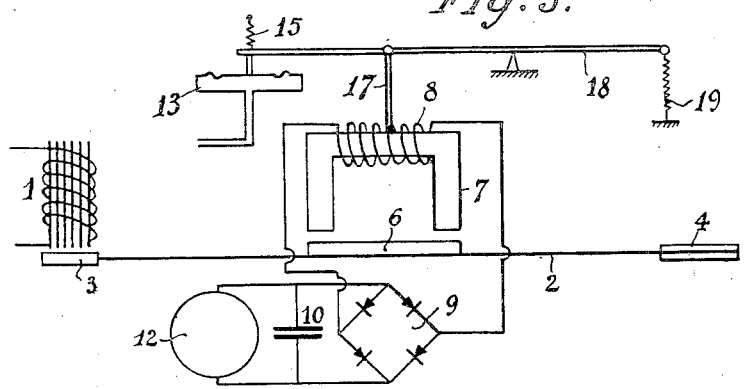
Fig. 3 is a modification of the device shown on Fig. 2.

As shown on Fig. 3, the magnetic circuit instead of the strip or rod holder may be arranged to be moved in response to pressure or other phenomenon. For this purpose, it is hung as diagrammatically illustrated, through a rod 17 from a scales arm 18 at the remote end of which is a spring 19. The manometric diaphragm 13 and its biassing spring 15 act on the other end of scales arm 18 and the strip or rod 2 is held in stationary support 4.

Figure 4:
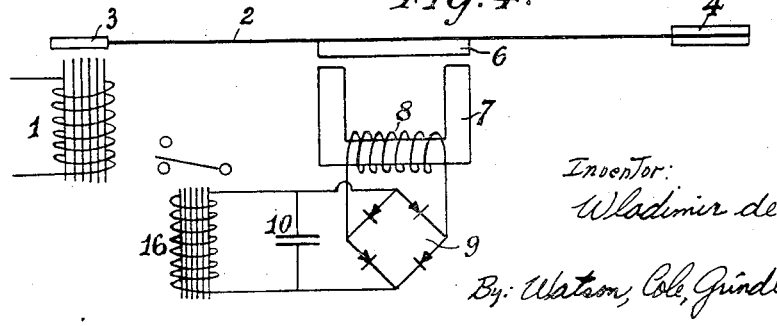
Fig. 4 shows remote control means.

Fig. 4 shows an example of a relay tuned to frequency. In this example, the relative position of permanent magnet 6 and magnetic circuit 7 is no longer dependent on an extraneous phenomenon, and the gap varies only as the strip or rod 2 vibrates.

Alternating current having a frequency equal or proximate to the strip or rod mechanical frequency is supplied to coil 1. Coil 8 energizes a relay 16, preferably a sensitive relay, preferably through a bridge rectifier 9 and a filter 10 as before.

In this case, the device operates as a relay tuned to one frequency excluding any substantially different frequency; in other words, the relay operates its contacts in the case where a current at said frequency flows through coil 1, and only in this case.

Where direct current or a periodic current having a frequency different from the particular frequency above mentioned is passed through coil 1, the relay remains inoperative.

By reason of resonance taking place when coil 1 operates strip or rod 2, the latter is sensitive to a relatively small control power. When a sensitive relay is employed, the strip or rod oscillations are little damped, and the whole device is thus much sensitive.

The current at the proper frequency for operation of the relay can be superimposed on any other direct or alternating current having a different frequency, and the latter current does not influence the operation. Consequently the control current may be delivered to the mains or telephone line, thereby providing remote control without special pilot line. By simultaneously employing a plurality of units as above described, each being tuned to a different frequency, or using one unit controlled through impulses to actuate a selecting member, a selective remote control without pilot line may be provided.

While I have described efficient and reliable embodiments of my invention, the latter is not limited thereto as many modifications may be brought about in the same without departing from the spirit of the appended claims.

What I claim is:

1. The combination of a resiliently flexible elongated unit including a permanent magnet and a member of magnetic material located at points remote from one of the ends of said unit; movable anchoring means for supporting said unit solely at said end thereof in a variable position; means sensitive to a predetermined variable factor, for adjusting the position of said anchoring means as a function of said factor; means at a point proximate to said magnetic member for inducing therein a variable magnetic field; and means operatively coupled with said magnet for producing electric oscillations in response to the vibrations of the magnet.

2. The combination of a resiliently flexible elongated unit including a permanent magnet and a member of magnetic material located at points remote from an end of said unit; anchoring means for supporting said unit solely at said end thereof; means at a point proximate to said magnetic member for inducing therein a variable magnetic field; means operatively coupled with said permanent magnet for producing electric oscillations in response to the vibrations of said magnet; and means sensitive to a predetermined variable factor, for adjusting the mean gap between said permanent magnet and said oscillation producing means as a function of said factor.

3. The combination of a permanent magnet; resiliently flexible means for holding said magnet in a mean position; means for vibrating said magnet at a substantially constant frequency on either side of said mean position; means operatively coupled with said magnet for producing electric oscillations in response to the vibration of the magnet; and means for supporting said magnet holding means and said oscillation producing means with a variable gap therebetween, including means sensitive to a predetermined variable factor, for adjusting said variable gap as a function of said factor.

4. The combination of a resiliently flexible elongated unit including a permanent magnet and a member of magnetic material located at points remote from one of the ends of said unit; means for anchoring said unit at said end thereof; means at a point proximate to said magnetic member for inducing therein a variable magnetic field; means operatively coupled with said magnet for producing electric oscillations in response to the vibration of the magnet; and means sensitive to a predetermined variable factor for adjusting the relative position of said oscillation producing means with respect to the mean position of said permanent magnet as a function of said factor.

WLADIMIR DE FLIGUÈ.

REFERENCES CITED

The following references are of record in the file of this patent:

UNITED STATES PATENTS

| Number | Name | Date |
|---|---|---|
| 405,471 | Gleeson | June 18, 1889 |
| 1,588,227 | Holte | June 8, 1926 |
| 1,637,442 | Dorsey | Aug. 2, 1927 |
| 1,878,101 | Bradbury | Sept. 20, 1932 |
| 2,286,499 | Mittleman | June 16, 1942 |
| 2,296,745 | Smith | Sept. 22, 1942 |
| 2,402,012 | Bennett | June 11, 1946 |